United States Patent [19]

Thorpe

[11] 4,014,850

[45] Mar. 29, 1977

[54] FRICTION ELEMENTS CONTAINING NOVEL FRICTION PARTICLES

[75] Inventor: Donald H. Thorpe, Williamsville, N.Y.

[73] Assignee: Hooker Chemicals & Plastics Corporation, Niagara Falls, N.Y.

[22] Filed: June 23, 1975

[21] Appl. No.: 589,637

[52] U.S. Cl. .................................. 260/38; 106/36; 260/838

[51] Int. Cl.² ......................................... C08L 61/06

[58] Field of Search ........... 260/DIG. 39, 860, 861, 260/38, 838; 106/36

[56] References Cited

UNITED STATES PATENTS

| | | | |
|---|---|---|---|
| 2,256,646 | 9/1941 | Kuznick et al. | 260/838 X |
| 2,457,003 | 12/1948 | Spokes | 260/838 X |
| 2,669,554 | 2/1954 | Armitage | 260/838 X |
| 3,730,920 | 5/1973 | D'Alessandro | 106/36 X |
| 3,823,202 | 7/1974 | Buzhee et al. | 260/861 |
| 3,843,615 | 10/1974 | Herwig et al. | 260/860 |

*Primary Examiner*—Donald E. Czaja
*Assistant Examiner*—S. M. Person
*Attorney, Agent, or Firm*—Peter F. Casella; Howard M. Ellis

[57] ABSTRACT

A friction element which has good friction stability and good braking fade resistance contains friction particles which are insoluble, infusible, and have narrow size range, and are prepared from a crosslinked thermosettable resin in liquid suspension. Also disclosed is a friction particle prepared according to the above process or according to a conventional process.

15 Claims, No Drawings

FRICTION ELEMENTS CONTAINING NOVEL FRICTION PARTICLES

BACKGROUND OF THE INVENTION

This invention relates to a friction element containing substantially spherical particles of crosslinked thermosetting resin in a size range suitable for such use, prepared by a suspension process. Also disclosed is a friction element containing a novel polyester friciton particle prepared according to this process or prepared according to a conventional process.

As used herein "friction particle" is intended to means a particulate material having the properties of no substantial softening at elevated temperatures and a material which will not flow together or cohere with other particles, as would be the case with a "friction binder." A "friction particle" will not fuse with like friction particles, and is insoluble. A friction particle is held in place with a friction binder.

As used herein, a "friction binder" has the properties of flowability and adhesive and cohesive binding action, for the purpose of binding together the asbestos and other additives (including a friction particle) necessary for building a brake lining or other similar article of manufacture.

As used herein, a "friction element" is a composition useful as linings or facings in brakes, main clutches, and banded clutch facings of power transmission speed control structures of power driven devices such as automotive vehicles. Friction elements as now made are composed in general of the filamentous reinforcing friction material, bonded with a friction binder and containing other organic or mineral friction controlling agents which may include, by way of example, extending materials for imparting specific properties or characteristics to such friction elements, for example, heat resistance, resistance to moisture sensitivity, wear and noise. One such friction controlling agent is a friction particle as defined above.

It is known that friction elements which are intended for heavy duty brake or clutch operations in motor vehicles must withstand severe service conditions. In use they are subjected to rigorous treatment by repeated and often prolonged braking or clutching applications which develop high temperatures, particularly above 500° F in the friction elements, and temperatures frequently exceed 1000° F on the friction surface of the elements, while progressively decreasing inwardly of such surface. These high temperatures, especially when occurring during high speed stops or following repeated applications of the brakes, tend to depolymerize or otherwise decompose the substances which are employed as friction particles in the friction elements. Decomposition of the friction particles results in the formation of gaseous or liquid products of heart decomposition which can in some cases cause marked softening of the friction element with consequent loss of braking efficiency. When friction elements exhibit a loss of stability of friction charateristics originally existing, they can produce after vigorous braking applications a condition which automotive engineers customarily refer to as "brake lining fade." Friction particles which exhibit minimal loss of stability of friction characteristics in a friction element are said to have good friction stability and good braking fade resistance.

A friction element comprising a filamentous reinforcing friction material such as asbestos fiber, a friction binder, friction binder, friction particle and other additives is heated to about 300° to 400° F and pressed at about 500 to 3000 lbs./in. in order to form a brake lining composition, clutch facing or other braking device. Thus the friction particle is substantially insoluble and infusible, softening only at elevated temperatures (i.e. above about 400° to 500° F).

SUMMARY OF THE INVENTION

It has now been found that an improved friction element containing friction particles of more uniform particle size distribution results when friction particles are prepared by the process of the present invention. The process of the present invention comprises the following steps: crosslinking a thermosetting polymer resin in liquid suspension with a suspension stabilizer to control particle size, either alone or with a wetting agent; filtering or centrifuging the particles; and drying the particles. A polymerization catalyst can be used in the crosslinking step. A crosslinking agent can be used to crosslink the suspended resin. Since the particles are crosslinked and are infusible and insoluble, they may be isolated at the conclusion of the polymerization by decanting off the water layer, applying heat and vacuum, and distilling off the remaining water. Also disclosed is a friction element containing a novel crosslinked polyester friction particle prepared by crosslinking in suspension, as described above, or prepared conventionally with grinding and sizing steps.

DESCRIPTION OF THE PREFERRED EMBODIMENTS

As an example of a composition illustrating application of the process of the present invention, unsaturated polyesters are prepared by first reacting substantially molar equivalent amounts of at least one polycarboxylic acid, preferably a dicarboxylic acid, with at least one polyol, prefereably a diol, until the acid number of the reaction mass is within the desired range, preferably from about 10 to about 50.

As typical of the diols, aliphatic and aromatic, which can be used to prepare a saturated polyester component the following are mentioned by way of examples: ethylene glycol, propanediol-1,2; propanedial-1,3; butanediol-1,4; hexanediol-1,6; diethylene glycol, dipropylene glycol and higher homologues thereof, neopentyl glycol, 2,2,4-trimethylpentanediol, dimethylol cyclohexane, oxyalkylated bisphenols, such as bishydroxyethyl ether of 2,2(4,4-bishydroxydiphenyl)propane and bishydroxypropyl ether of 2,2(4,4-bishydroxydiphenyl)-propane.

The diols generally have 2 to about 25 carbon atoms, preferably 2 to about 8 carbon atoms. Mixtures of these and equivalent diols are contemplated also. Further, a diol as exemplified above in admixture with minor amounts, less than about 20 percent by weight of a polyol having 3 to about 20 carbon atoms and having 3 to about 6 carbon hydroxyl groups, such as glycerine, trimethylolpropane, pentaerythritol, mannitol, and the like, can be used also.

The polycarboxylic acids or anhydrides suitable for the preparation of an unsaturated polyester contain from 4 to about 25 carbon atoms, preferably 4 to about 8 carbon atoms, and include the following $\alpha, \beta$-unsaturated compounds by way of illustration: maleic acid and anhydride, fumaric acid, citraconic acid, itaconic acid, mesaconic acid, aconitic acid, and glutoconic acid.

In addition the polyesters may be modified by the inclusion of up to 75 mole percent (measured as mole percent of total acids) of nonpolymerizable acids or anhydrides having about 4 to about 25 carbon atoms, preferably about 6 to about 10 carbon atoms, and from 2 to about 6 carboxyl groups, of which the following acids or anhydrides are mentioned by way of examples: phthalic acid, isophthalic acid, terephthalic acid, tetrahydrophthalic acid, hexahydrophthalic acid, endomethylenetetrahydrophthalic acid ("Nadic Acid"), adipic acid, sebacic acid, tetrachlorophthalic acid, chlorendic acid. Where available, the anhydrides or acid halides of these and equivalent dicarboxylic acids can be used also.

The unsaturated polyesters as contemplated for use in the compositions of this invention are well known in the art. As is known also such polyesters are derived by reaction of a diol, such as has been defined and illustrated hereinabove and an unsaturated polycarboxylic acid such as has been defined and illustrated above. If desired, the unsaturated polymer can be prepared using the anhydrides, or acid halides when available, of the above named polybasic acids, or mixtures of these acids and equivalent acids together with the same or different acid, anhydride, or acid halide.

A crosslinking agent which can be used to crosslink the suspended resin is an $\alpha, \beta$-ethylenically unsaturated monomer which is copolymeizable with the unsaturated polyester. Such monomers are known in the art and generally contain about 4 to about 20 carbon atoms and a $CH_2=C<$ group. Illustrative of suitable monomers are the following: styrene, o-chlorosytrene, vinyl toluene, divinyl benzene, diallyl phthalate, diallyl isophthalate, triallyl isocyanurate, diacetone acrylamide, acrylate esters, methacrylate esters, methylmethacrylate, n-butylacrylate, acrylonitrile, methacrylonitrile, vinyl acetate, vinyl propionate, diallyl fumarate, and mixtures of these and equivalent monomers. Of these, styrene is generally to be preferred.

The amount of such monomer used is generally within the range of about 10 to about 65 percent and preferably within the range of about 20 to about 60 percent by weight of the mixture of polyesters and monomer.

The polyester compositions can contain, as a rule, known inhibitors to prevent premature polymerization, such as tolylhydroquinone, p-benzoquinone, 2,5-di-tert-butylquinone, hydroquinone, tert-butyl pyrocatechol, 4-ethyl-pyrocatechol, copper compounds, hydroxylamine derivaties, and the like, preferably tolylhydroquinone, in amounts preferably from about 0.010 to about 0.020 percent by weight.

A polymerization catalyst, which may be a free radical initiator, is used to catalyze the copolymerization of the unsaturated polyester and unsaturated monomer. It is well known to use an organic peroxide to initiate the copolymerization and typical examples of such peroxides include the following by way of examples: tert-butylperbenzoate, benzoyl peroxide, methylethylketone peroxide, lauroyl peroxide, cumene peroxide, tert-butylperoctoate, 2,5-dimethyl-2,5-bis(2-ethyl hexanoyl peroxy)hexane, and the like. Other free radical generating substances, such as 2,2°-azobisisobutyronitrile, can be used, such as disclosed in U.S. Pat. No. 2,255,313, which is incorporated herein by reference.

The corrslinked polyesters may be produced from the materials described hereinbefore in bulk form, for example as lumps, sheets, or as cast into any desired shape. The polyesters produced in bulk can then be pulverized in conventional grinding equipment for use as friction particles of the invention. The particle size distribution is generally at least 90 percent finer than 20 mesh and coarser than 100 mesh.

In the process of the invention, which eliminates conventional grinding and sizing operations, the unsaturated polyesters are suspended in a liquid medium, preferably water, where crosslinking takes place with the help of a free radical initiator as described above, added under an inert atmosphere. To control particle size, suspension stabilizers can be used, such as methylcellulose, hydroxyethylcellulose, hydroxypropylmethylcellulose, styrene-maleic copolymers, polyacrylic acids, methacrylic acids, methylvinyl ether-maleic copolymers, polyvinyl pyrrolidone, and polyvinyl alcohol or mixtures thereof in amounts of about 0.05 to about 1 weight percent, preferably about 0.1 to about 0.5 weight percent, based on the weight of thermosettable resin, and can be used either alone or with wetting agents such as sodium alkyl benzene sulfonates, dioctyl sodium sulfosuccinate and the like. The suspension of unsaturated polyester globules of the desired size range is held for about 1 to 6 hours at a temperature of about 20° to 100° C.

A further illustration of a composition which may be prepared by the suspension process of the invention is a thermosettable cashew nut shell oil resin, which can be crosslinked in suspension, preferably in aqueous suspension with addition of the aforementioned suspension stabilizers in amounts of about 0.05 to about 1 weight percent, preferably 0.1 to 0.5 weight percent, and can be used either alone or with wetting agents, such as sodium alkyl benzene sulfonates, dioctyl sodium sulfosuccinate and the like. Tricalcium phosphate can be used as a suspension stabilizer in amounts of from about 1 weight percent to about 5 weight percent, in conjunction with a wetting agent, such as the aforementioned examples. The crosslinking of the cashew nut shell oil resin may also take place by means of a crosslinking agent, preferably by means of a methylene donor, such as formaldehyde, hexamethylenetatramine, and paraformaldehyde. A polymerization catalyst can be used, preferably a strong mineral acid, or a substance such as diethyl sulfate which releases a strong mineral acid under reaction conditions employed.

Crosslinking of the thermosettable resins of the present invention can take place in a liquid medium such as water, glycols, and alcohols, preferably water. Higher boiling liquids can be used if the crosslinking temperature is greater than 100° C.

Because the substantially spherical crosslinked resin particles prepared by the suspension process fall within a relatively narrow size range, which can be predetermined by regulation of the amount of suspension stabilizer employed, a more uniform shape and size of particle can be obtained than results from the conventional grinding and size classification operations previously necessary to prepare friction particles from resins prepared in bulk. The particle size range is from about 60 to about 95 weight precent between 40 and 100 mesh, with less than about 30 weight percent finer than 100 mesh, preferably about 80 to about 95 weight percent between 40 and 100 mesh, with less than about 15 weight percent finer than 100 mesh, and even more preferably about 90 to about 95 weight percent between 40 and 100 mesh, with less than about 5 weight percent finer than 100 mesh.

After crosslinking, the particles can be recovered by filtering or centrifuging followed by drying. Since the particles are crosslinked and are infusible and insoluble, they can be isolated at the conclusion of the polymerization by decanting off the liquid layer, applying heat and vacuum and distilling off the remaining water. A horseshoe type agitator can conveniently be used to move the particles and transfer heat. The spherical solid particles are free flowing and can readily be drummed or bagged.

The particles prepared by the process of the invention are added as friction modifiers to friction elements in the amounts of about 1 to about 30 weight percent, preferably about 5 to about 15 weight percent based on the total composition weight. A typical friction element contains about 30 to 60 weight percent by asbestos fiber, up to 40 weight percent of other organic fillers, about 5 to 15 weight percent of organic filler, including the friction particle of this invention, and about 15 to 30 weight percent of friction binder; all percentages are by weight of total compositon. Asbestos fiber, other organic and inorganic filler materials and friction modifiers are charged into a mixer followed by the addition of a friction binder, such as a varnish material. The materials are kneaded until the fiber, abrasives and any fillers are thoroughly wetted and uniform mass is obtained. The mass is discharged from the mixer, rolled out into sheets, extruded, or pressure molded and dried, after which it is ready for further processing into friction elements. Friction modifiers which may be used in addition to the friction particles disclosed and claimed herein include, by way of example, metal shavings and fillings, silica, pulp, wood flour, chalk, clay, mica, fiberglass, silt, carbon black, rubber, graphite, metal nitrides and oxides, and polymerizate of round cashew nut shell oil to achieve the particular amount of bulk and coefficient friction desired. In a dry mix process, powdered thermosetting resins are mechanically mixed with asbestos fiber, friction particles and fillers.

The mixture is molded into friction elements, which are press-cured only enough to prevent blistering. After molding, the lining segments are oven-cured in forms for several hours at 350° to 450° to complete the cure and develop maximum heart resistance. In the finished lining, a phenolic resin serves as a heat-resistant binder and contributes to long life by producing a dense molded product. U.S. Pat. No. 3,781,241 to Grazen et al., which is hereby incorporated by reference, gives a description of the preparation of a fiction element.

The following examples serve to illustrate the invention but are not intended to limit it. In the specification and claims, parts and proportions are expressed by weight and temperatures in degrees Centigrade unless specified otherwise.

EXAMPLE 1

A reaction vessel was charged with 1.05 moles of neopentylglycol and 0.5 moles of isophthalic acid. The mixture as heated to 200° C and esterification continued to an acid number of less than 15. To this reaction mixture was added 0.5 moles of maleic anhydride and esterification was continued to an acid number of 25 to 30. The reaction mixture was cooled and dissolved in vinyl toluene to give a 65 weight percent solution of polyester, hereinafter identified as Polyester I.

EXAMPLE 2

A reaction vessel was charged with 0.75 moles of isophthalic acid, 0.46 moles of ethylene glycol, 1.36 moles of diethylene glycol, and mole of maleic anhydride. Esterification at 200° C proceeded to give a mixture with an acid number of 25 to 30. The reaction mixture was cooled and a 65 percent solution in styrene was made of the polyester, hereinafter designated as Polyester II.

EXAMPLE 3

A reaction vessel was charged with 1.05 moles of propylene glycol, 0.9 moles of maleic anhydride, 0.1 moles of phthalic anhydride. The reaction mixture was heated to 200° C and esterification to an acid number of 36 took place. A 66.7 percent solution was prepared in styrene of the polyester, hereinafter disignated as Polyester III.

EXAMPLE 4

A reaction vessel comprising a twelve liter three necked flask equipped with a hook agitator, thermometer, and distillation condenser was charged with 8,000 grams of treated cashew nut shell oil and 80 grams of diethyl sulfate. The mixture was heated to 200° C under a vacuum and maintained at these conditions for 4 ½ hours. A sample of this mixture in 50% toluene solution had a Brookfield viscosity of 43.5 centipoises at 25° C. Further heating of the reaction mixture was continued at 180° C for 10 hours. A 50% toluene solution of the final reaction mixture had a Brookfield viscosity of 156 centipoises at 25° C. After cooling of the final reaction mixture, hereinafter designated as Resin IV, the Brookfield viscosity of a 50% toluene solution was 218 centipoises at 25° C.

EXAMPLE 5

A reaction vessel comprising a five liter, three necked flask, equipped with a paddle stirrer, thermoneter, reflux condenser and nitrogen sparge, was charged with 1300 grams of the Polyester I, 155 grams of 4% solution of a methylhydroxypropyl cellulose (Methocel 90 HG-100), 0.4 grams of a 70% solution of dioctylsodium sulfosuccinate (Aeresol GPG), and 1850 grams of water. The mixture was heated to 50° C under a nitrogen atmosphere and 13 grams of benzoyl peroxide was added. The mixture was stirred to produce a suspension, heated to 80° C and held at this temperature for three hours. The particles formed were filtered in a Buchner funnel and dried overnight at 110° C.

The particles formed were spherical and had the following properties.

| Screen Test | On 14 Mesh | 0.9% |
| --- | --- | --- |
| | On 40 Mesh | 5.3% |
| | On 100 Mesh | 80.8% |
| | Thru 100 Mesh | 13.0% |
| Acetone Extract - 16 hours | | 4.3% |

EXAMPLE 6

A reaction vessel comprising a two gallon stainless steel kettle was charged with 3640 grams of water, 0.8 grams of Aeresol GPG, 390 grams of a 4% solution of Methocel 90 HG-100. To this mixture was added 2600 grams of Polyester II. This mixture was heated to 50° C under a nitrogen atmosphere and stirred, forming a suspension to which was added 26 grams of benzoyl peroxide. The suspension was then heated to 80° C. and held at this temperature for three hours. At the end of this period of time, agitation was stopped, and the particles were allowed to settle. The upper aqueous layer was removed by vacuum through a fritted glass sparger. The agitator was started, heat was applied on vacuum, and the balance of the water was removed in an operation terminating at 100° C and 28 inches of mercury vacuum.

The spherical particles formed were free flowing and had the following properties.

| % Moisture (Karl Fisher) | | 0.6% |
|---|---|---|
| Screen Test | 14 Mesh | 0.4% |
| | 40 Mesh | 10.5% |
| | 100 Mesh | 62.0% |
| Thru 100 Mesh | | 27.1% |
| Acetone Extract - 16 hours | | 2.4% |

EXAMPLE 7

A reaction vessel comprising a one liter three necked flask equipped with a paddle stirrer, a thermometer, reflux condenser, and nitrogen sparge was charged with 60 grams of Polyester II. To this mixture was added 30 grams of a 4% solution of Methocel 90 HG-100, 1.0 grams of Aeresol GPG and 370 grams of water. A suspension was formed, and the suspension was heated to 50° under a nitrogen atmosphere, and 2 grams of benzoyl peroxide was added. The resulting suspension was then heated to 80° C and held at this temperature for 2 hours. The product was filtered, washed, dried, and a free flowing fine spherical particle was obtained.

EXAMPLE 8

A reaction vessel comprising a five liter flask with a stainless steel hook stirrer and reflux condenser was charged with 800 grams of the resin prepared in Example 4 and warmed to about 85° C. A solution was made of 2.4 grams of Methocel 90HG 100, 1.2 grams of Aerosol GPG, and 1420 grams of water. This solution was heated to about 65° C and added to the resin in the flask with stirring, forming an aqueous suspension. A 49% formalin solution (240 grams) and 40 grams of diethyl sulfate was then added. The suspension was heated 85°–90° C for ten hours and the crosslinked polymer particles were recovered by vacuum filtering through a Buchner funnel and washed with water. After drying at 100° to 110° C, the particles have the following properties.

| Screen Test | 14 Mesh | All through |
|---|---|---|
| | 40 Mesh | 0.8% |
| | 100 Mesh | 98.4% |
| Through 100 Mesh | | 0.8% |
| Acetone Extract - 16 hours | | 3.4% |

EXAMPLE 9

A composition employing the friction particles of Example 2 was prepared comprising the following formulation:

| Asbestos-Johns-Manville 6D30 | 100 parts |
|---|---|
| Barium Sulfate | 40 Parts |
| Graphite AS 50 - Airco Speer | 4 Parts |
| Durez 14,000 Phenol-Formaldehyde resin | 40 Parts |
| Friction Particles of Example 7 | 16 Parts |

The above materials were weighed into a two quart Sealright carton with two No. 6 rubber stoppers and tumbled for one hour.

EXAMPLE 10

A composition was prepared identical to that described in Example 9 shell oil that cashew nut shelloil resin friction particles prepared in bulk, followed by grinding in the conventional manner, (Colloid 10-40) were substituted for the friction particle of Example 7. This composition was prepared to be used for comparative testing.

This composition (56 grams) was molded onto a ⅝ inch × 2 ½inch disc at 330° F for 15 minutes with degassing at intervals of 1, 2, and 3 minutes. A second disc prepared from the composition of Example 7 was used for comparative testing.

EXAMPLE 11

A composition was prepared identical to that described in Example 9 except that cashew nut shell oil resin friction particles of Example 8 (prepared by the suspension process) were substituted for the friction particle of Example 7. This composition was prepared to be used for comparative testing.

This composition was molded onto a disc as described in Example 10.

EXAMPLE 12

A specimen measuring 0.5 inches × 0.5 inches × 0.135 inches was cut from the disc of Example 10 and tested on a FAST machine. This machine when operated in the constant friction force test mode of operation, maintains both friction force and sliding velocity of the tested sample at constant values. Because the tangential friction force acting on the tested specimen is held constant, the value of the dynamic coefficient of friction relative to changes in the normal clamping force, vary in a reciprocal relationship. Furthermore, if the distance traveled is held constant, the same amount of work is absorbed in each test when the test cycle time and velocity are maintained at identical values. For a given test, this work is dissipated in the form of heat, largely within the friction disc. If each disc is of the same material, mass, and initial temperature, it follows that nearly identical temperature histories are experienced with each test run. Therefore disc temperature may be measured and related directly to time measurements.

Table I shows the results of test carried out on the FAST machine. Column C shows the results obtained from the composition of Example 9, and column D shows the results obtained from the composition of Example 10. Column A shows the results for a composition prepared according to Example 9, with substitution of the friction particles of Example 5. Column B shows the results for a composition prepared using friction particles prepared according to Example 6. Column E shows results employing a composition prepared according to Example 10. with substitution of Polymer 340 commercial friction particles for Colloid 10-40. Polymer 340, as well as Colloid. 10-40, compositions are manufactured from a commerical cashew nut shell oil resin prepared in bulk, followed by grinding and sizing. As is apparent from the results of Table I, the compositions employing crosslinked unsaturated polyester resins (Columns A, B, and C) show superior fade resistance, as well as a more favorable minimum coefficients of friction than the comparison samples prepared from commercial cashew nut shell oil resin particles.

EXAMPLE 13

Column F of Table I shows FAST machine results for friction particles of Example 11. Results obtained are equivalent to or better than those obtained for commercial gelled cashew nut shell oil friction particles prepared by the conventional oven roasting and grinding technique (Column D and E). The suspension process of the present invention leads to a more uniform friction particle size distribution and obviates the necessity of a roasting and grinding operation.

TABLE I

FORMULATIONS AND TEST RESULTS ON BRAKE LINING COMPOSITIONS

|  | A | B | C | D | E | F |
|---|---|---|---|---|---|---|
| Asbestos JM6D 30 | 100 | 100 | 100 | 100 | 100 | 100 |
| Barium Sulfate | 40 | 40 | 40 | 40 | 40 | 40 |
| Graphite AS 50 | 4 | 4 | 4 | 4 | 4 | 4 |
| Durez 14000 | 40 | 40 | 40 | 40 | 40 | 40 |
| Particles - Example 4 | 16 | | | | | |
| Particles - Example 5 | | 16 | | | | |
| Particles - Example 6 | | | 16 | | | |
| Particles Colloid 10–40 | | | | 16 | | |
| Particles Palmer 340 | | | | | 16 | |
| Particles - Example 11 | | | | | | 16 |
| Cure Temp. ° F. | 330° F. | 330° F. | 330° F. | 330° F. | 330° F. | 330° F. |
| Time Min. | 15 | 15 | 15 | 15 | 15 | 15 |
| Pressure psi | 3000 | 3000 | 3000 | 3000 | 3000 | 3000 |
| Post Bake 16 hours including 3 hours-350° F. 3 hours-400° F. | yes | yes | yes | yes | yes | yes |
| FAST Results |  |  |  |  |  |  |
| Max. coefficient of friction | 0.55 | 0.50 | 0.50 | 0.50 | 0.50 | 0.50 |
| Min. coefficient of friction | 0.25 | 0.30 | 0.23 | 0.18 | 0.18 | 0.23 |
| Wear Rate $\frac{10^{-3} in^3}{hp - hr}$ | 8.94 | 8.42 | 8.01 | 7.72 | 7.88 | 7.75 |
| Fade | fair | good | fair | poor | poor | fair |

While this invention has been described with respect to certain embodiments, they are not intended to limit the scope of the invention, but rather to illustrate the invention.

I claim:

1. In a friction element which comprises a filamentous friction material, a thermosettable resin friction binder, and a friction particle, the improvement wherein the friction particle is a particulate product prepared by polymerizing a cashew nut shell oil suspended in a liquid medium to form a resin and crosslinking the suspended resin with a crosslinking agent in the presence of a suspension stabilizer.

2. The element of claim 1 wherein crosslinking of the friction particle takes place in the presence of a polymerization catalyst.

3. The element of claim 1 wherein a wetting agent is used in conjunction with the suspension stabilizer.

4. The element of claim 3 wherein the wetting agent is selected from the group consisting of sodium alkylbenzene sulfonates and dioctyl sodium sulfosuccinate.

5. The element of claim 2 wherein the polymerization catalyst is selected from the group consisting of benzoyl peroxide, lauroyl peroxide, tert-butyl perbenzoate, tert-butylperoctoate, 2,5-dimethyl-2,5-bis(2-ethyl hexanoyl peroxy)hexane, and 2,2'-azobisisobutyronitrile.

6. The element of claim 1 wherein the suspension stabilizer is selected from the group consisting of methylcellulose, hydroxyethylcellulose, hydroxypropylmethylcellulose, styrene-maleic copolymers, polyacrylic acids, methacrylic acids, methylvinyl ether-maleic copolymers, polyvinyl pyrrolidone, and polyvinyl alcohol, and mixtures thereof.

7. The element of claim 6 wherein the suspension stabilizer is present from about 0.05 to about 1 weight percent.

8. The element of claim 1 wherein the suspension stabilizer is a phosphate of an alkaline earth metal in an amount of about 1 to about 5 weight percent.

9. The element of claim 8 wherein the suspension stabilizer is tricalcium phosphate.

10. The element of claim 2 wherein the catalyst is a strong mineral acid or diethylsulfate.

11. The element of claim 1 wherein the crosslinking agent is a methylene donor.

12. The element of claim 1 wherein the liquid medium is a material selected from a group consisting of water, glycols and alcohols.

13. The element of claim 11 wherein the methylene donor is a material selected from the group consisting of formaldehyde, hexamethylenetetramine and paraformaldehyde.

14. The element of claim 12 wherein the liquid medium is water.

15. The element of claim 13 wherein the methylene donor is formaldehyde.

* * * * *